United States Patent
Bornhorst et al.

(10) Patent No.: US 6,666,316 B2
(45) Date of Patent: Dec. 23, 2003

(54) HYDRAULIC ACTUATED RADIAL FRICTION CLUTCH/BRAKE

(75) Inventors: John B. Bornhorst, New Bremen, OH (US); Keving Evers, Fort Recovery, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 10/108,773

(22) Filed: Mar. 28, 2002

(65) Prior Publication Data

US 2003/0183476 A1 Oct. 2, 2003

(51) Int. Cl.[7] ............................................. B30B 15/00
(52) U.S. Cl. ..................................... 192/88 B; 100/257
(58) Field of Search ........................... 192/88 B, 85 AT, 192/79, 80; 72/441, 446; 100/257

(56) References Cited

U.S. PATENT DOCUMENTS

| | | |
|---|---|---|
| 2,093,281 A | 9/1937 | Kreuser |
| 2,745,435 A | 5/1956 | Hobbs |
| 3,362,733 A | 1/1968 | Klara |
| 3,547,244 A | 12/1970 | Fergle et al. |
| 3,648,812 A | 3/1972 | Kost |
| 3,726,123 A * | 4/1973 | Bothe ........................... 72/441 |
| 3,771,930 A * | 11/1973 | Ginzel et al. .................. 425/78 |
| 3,991,681 A * | 11/1976 | Antosiak ..................... 100/257 |
| 4,093,052 A | 6/1978 | Falk |
| 4,264,229 A * | 4/1981 | Falk et al. ....................... 403/5 |
| 4,823,687 A * | 4/1989 | Yonezawa et al. ........... 100/346 |
| 5,051,018 A | 9/1991 | Appell et al. |
| 5,109,766 A * | 5/1992 | Ontrop et al. ............... 100/257 |
| 5,349,902 A * | 9/1994 | Daniel et al. ................ 100/48 |
| 5,682,813 A * | 11/1997 | Brewer et al. ............... 100/257 |
| 5,865,070 A * | 2/1999 | Bornhorst et al. ............ 74/603 |
| 2003/0041643 A1 * | 3/2003 | Tang et al. .................... 72/450 |
| 2003/0047404 A1 * | 3/2003 | Falk ........................... 192/79 |

FOREIGN PATENT DOCUMENTS

JP          5-161999     *  6/1993

* cited by examiner

*Primary Examiner*—Rodney H. Bonck
(74) *Attorney, Agent, or Firm*—Randall J. Knuth

(57) ABSTRACT

The present invention relates to an apparatus and method for adjusting the stroke length of a slide in a press. A sleeve works as a fluid bearing in relation to a shaft. Upon applying pressure to the sleeve, the sleeve creates an interference fit with the shaft. Once the interference fit exists, the position of the shaft can be adjusted to change the stroke length of the slide in the press.

15 Claims, 3 Drawing Sheets

HYDRAULIC ACTUATED RADIAL FRICTION CLUTCH/BRAKE

BACKGROUND OF THE INVENTION

1. Field of the Invention

The present invention relates to an apparatus and method of utilizing a sleeve as both a fluid bearing and for creating an interference fit with a shaft. Once the interference fit is created with the shaft, the position of the shaft is adjusted to change the stroke length of a slide in a press.

2. Description of the Related Art

Adjusting the stroke length of a slide in a press is a function that is necessary depending on the type of material being pressed, as well as, the resulting desired shape of the material after the press stroke. One way of adjusting the slide is by utilizing a lever. The lever is inserted into a bore located within a flywheel. The bar is moved up or down to manually rotate the flywheel causing the stroke length to be adjusted. Two people are required to adjust the slide in this manner. One person moves the bar up and down while the second person tells the first person when the slide is in the proper position. This method of adjusting the slide is very inefficient as two people are needed to adjust the slide and those two people are not doing other aspects of their jobs while they are adjusting the slide. Also, this method of adjusting the slide is very imprecise because the second person's view is blocked by the first person adjusting the stroke length of the slide.

Another way of adjusting the slide is to intermittently engage the clutch while the flywheel is spinning to move the slide to the desired position. This method of adjusting the slide is very imprecise because of the difficulty of moving the slide in small increments. Also, engaging and disengaging of the clutch so often causes the clutch and the brake pads to wear quickly, as well as, possibly warp from the heat. The present invention solves these problems.

SUMMARY OF THE INVENTION

The present invention, in one form thereof, is a press having a housing wherein a shaft and a sleeve are disposed within the housing. A pressure means is in fluid communication with the sleeve for selectively supplying fluid pressure to the sleeve to create an interference fit between the sleeve and the shaft. The pressure means reduces fluid pressure to the sleeve to release the interference fit between the sleeve and the shaft wherein the sleeve works as a fluid bearing. An adjustment means is connected to the housing for adjusting the position of the shaft when the interference fit exists between the sleeve and the shaft.

The present invention, in another form thereof, is a press having a housing wherein a shaft and a sleeve are disposed within the housing. A pressure means is in fluid communication with the sleeve for supplying fluid pressure to the sleeve to create an interference fit between the sleeve and the shaft. The pressure means reduces fluid pressure to the sleeve to release the interference fit between the sleeve and the shaft wherein the sleeve works as a fluid bearing. An adjustment mans is connected to the housing for moving the housing to adjust the position of the shaft when the interference fit exists between the sleeve and the shaft.

The present invention, in yet another form thereof, is a method of adjusting the position of the shaft in a press. The first step of the method is providing a shaft and sleeve. The next step of the method is applying fluid pressure to the sleeve to create an interference fit between the sleeve and the shaft. The final step of the method is adjusting the position of the shaft when the interference fit exists between the sleeve and the shaft.

An advantage of the present invention is that a computer can be used to activate the adjustment of the position of the shaft which thereby adjusts the stroke length of the slide. By having the computer adjust the rotation of the shaft, the workers can perform other tasks to be more cost effective.

Another advantage of the present invention is that the apparatus used to adjust the rotation of the shaft allows for very precise adjustments to the stroke position of the slide without excess wear to the clutch or brake pads.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
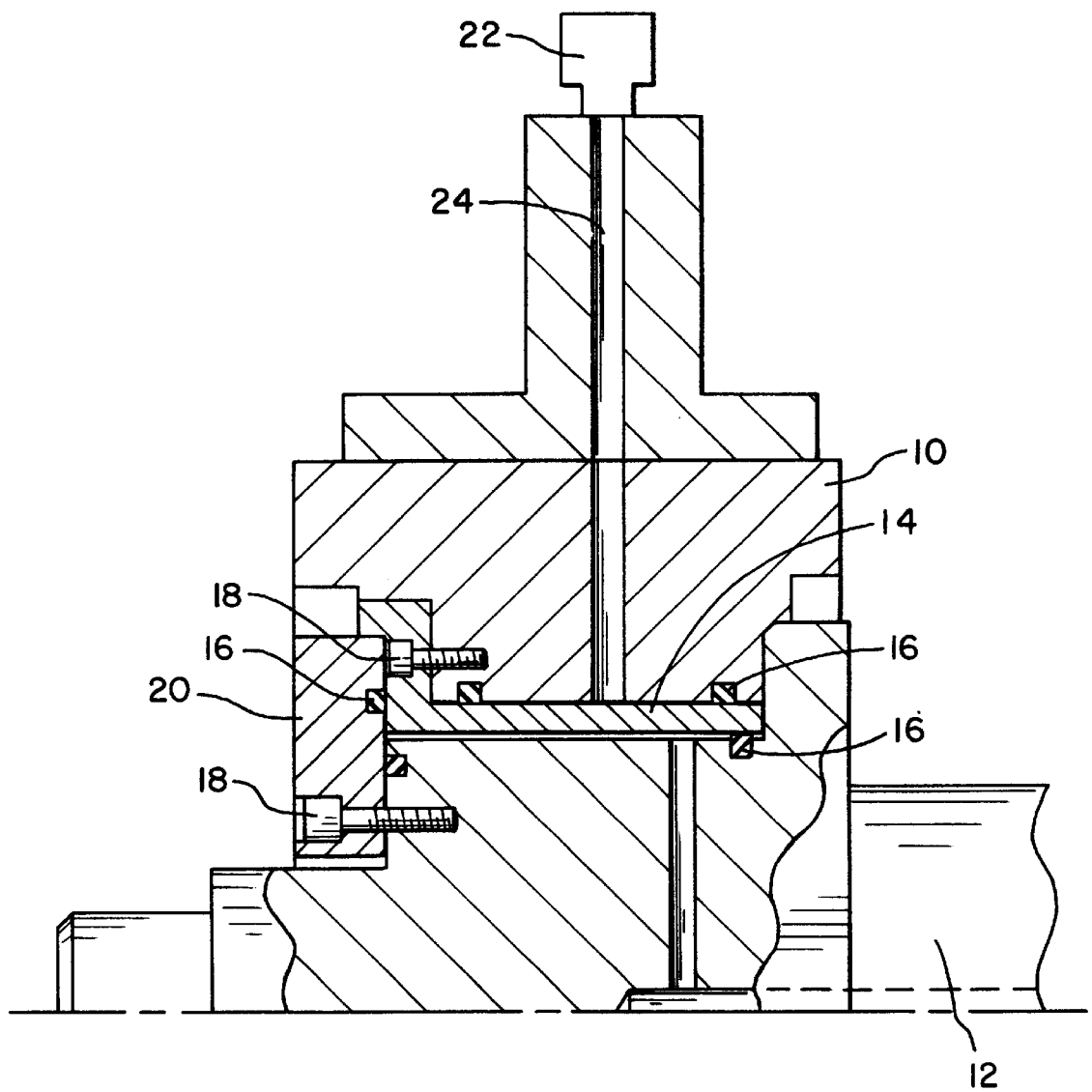
FIG. 1 is a sectional view of one form of the present invention.

The present invention, as shown in FIG. 1, is utilized to adjust the rotation of a shaft in a press. The position of the shaft can be adjusted such that the rotation of the crankshaft causes the stroke length for a slide in a press to either increase or decrease. The press in the present invention is a mechanical press but other types of presses can be utilized as well.

Figure 4:
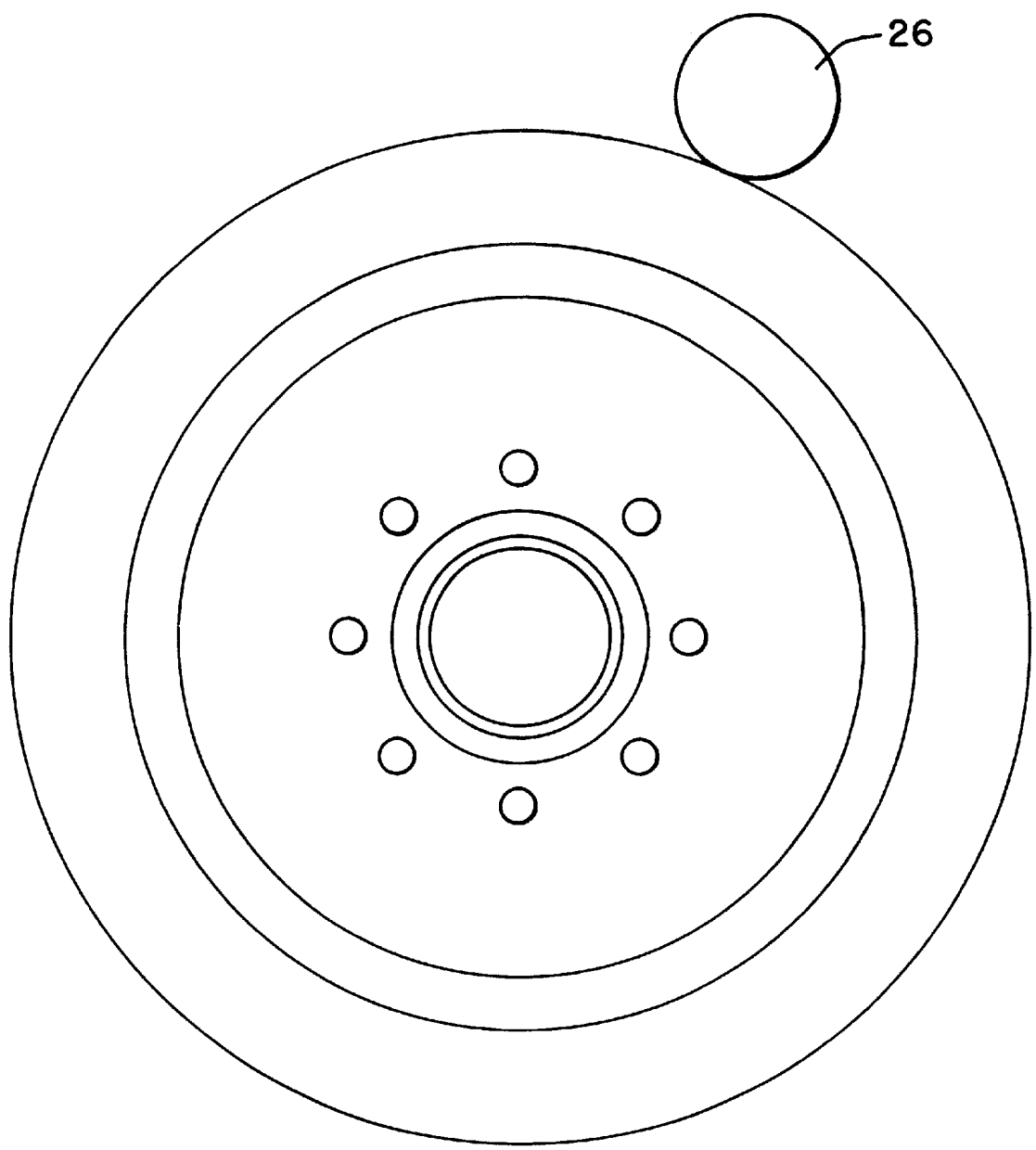
FIG. 4 is a sectional view of one form of the present invention.

The present invention has a housing 10. Disposed within housing 10 is a shaft 12 and a sleeve 14. Shaft 12 is a crankshaft or driveshaft but other types of shafts can be used as well. One end of sleeve 14 is connected to a retainer 20 using a bolt 18 but other connecting devices can be used. The distal end of sleeve 14 is connected to housing 10 using bolt 18 or other connecting devices. Housing 10 is connected to a helical gear (not shown) using a bolt or other connecting device. A drive gear 26 is utilized to rotate the helical gear. Driving gear 26 is shown in FIG. 4.

Figure 2:
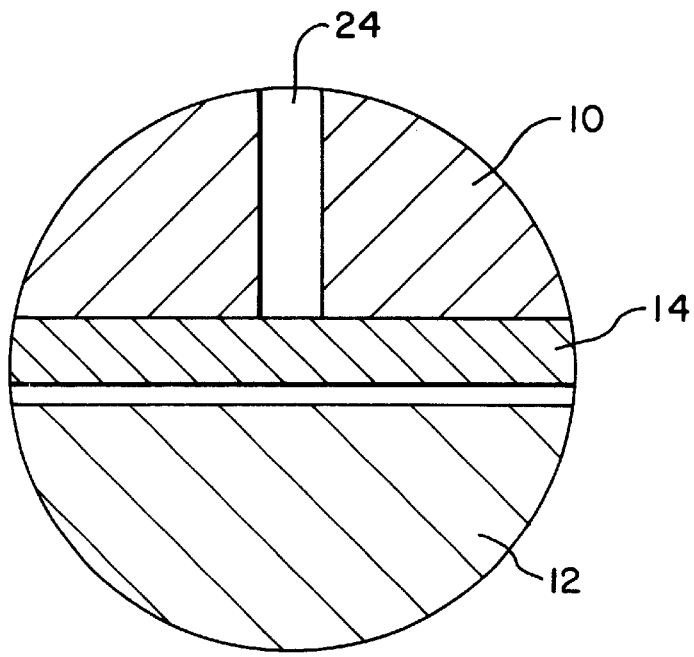
FIG. 2 is a sectional view of the sleeve acting as a fluid bearing in one form of the present invention.

A small clearance exists between shaft 12 and sleeve 14. The clearance is filled with oil provided through an axial bore through shaft 12. An oil supplying component (not shown) supplies the oil to the axial bore in shaft 12. Sleeve 12 works as a fluid bearing as shown in FIG. 2. The oil between shaft 12 and sleeve 14 is contained by seals 16.

Figure 3:
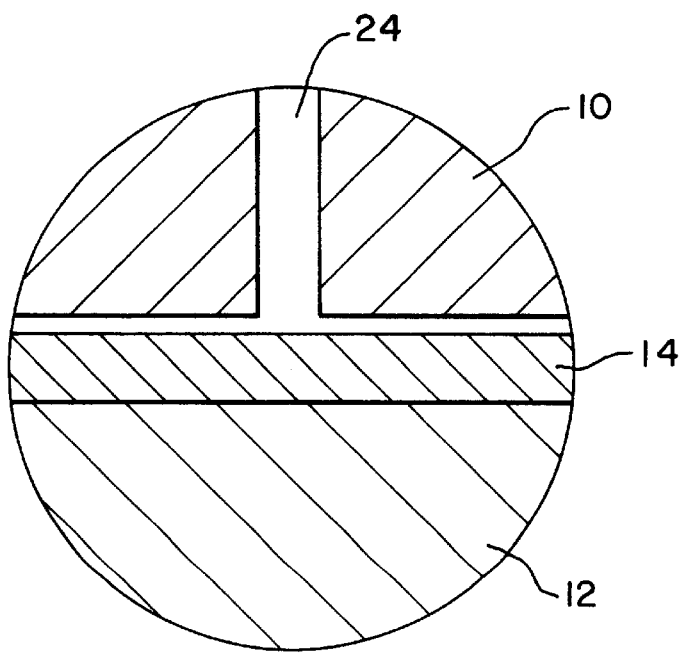
FIG. 3 is a sectional view of the sleeve in an interference fit with the shaft in one form of the present invention.

A pressure means 22 is in fluid communication with sleeve 14. The pressure supplied by pressure means 22 is oil pressure but other types of pressure, such as air, can be used as well. To adjust the position of shaft 12, pressure means 22 supplies oil through a pressure chamber 24. The oil supplied to pressure chamber 24 moves sleeve 14 into contact with shaft 12 causing an interference fit between sleeve 14 and shaft 12, as shown in FIG. 3.

Once the interference fit exists between sleeve 14 and shaft 12, driving gear 26 rotates causing the helical gear to rotate which further causes housing 10 to move. When housing 10 moves, shaft 12 rotates a small amount, such as one or two degrees. Shaft 12 can be adjusted by more or less than one or two degrees. Driving gear 26 is connected to a rotation device (not shown), such as a motor, to cause driving gear 26 to rotate and indirectly cause shaft 12 to rotate. Once shaft 12 is rotated, the stroke length of the slide in the press is increased or decreased based on the rotation of shaft 12. A computer (not shown) can be used to activate the rotation device.

Once the desired position of shaft 12 is established, pressure means 22 reduces or eliminates the oil pressure traveling through pressure chamber 24 to sleeve 14. This reduction or elimination of oil pressure causes sleeve 14 to release the interference fit with shaft 12. Once sleeve 14 releases the interference fit with shaft 12, sleeve 14 works as a fluid bearing once again.

The present invention, in another form thereof, is a method of adjusting the position of a shaft in a press. The first step of the method is providing a shaft and a sleeve. The next step of the method is applying fluid pressure to the sleeve to create an interference fit between the sleeve and the shaft. The fluid utilized to create the interference fit between the sleeve and the shaft is oil. Air or other types of fluids can be used as well. The final step of the method is adjusting the position of the shaft during the time the interference fit exists. This can be completed by moving the shaft housing to rotate the shaft into the proper position. Other ways of adjusting the position of the shaft can be utilized as well.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press comprising:

a housing;

a shaft disposed within said housing;

a sleeve disposed within said housing;

a pressure means in fluid communication with said sleeve for selectively supplying fluid pressure to said sleeve to create an interference fit between said sleeve and said shaft, said pressure means reduces fluid pressure to said sleeve to release the interference fit between said sleeve and said shaft wherein said sleeve is to operate as a fluid bearing; and an adjustment means connected to said housing for adjusting a rotational position of said shaft when the interference fit exist between said sleeve and said shaft.

2. The press in claim 1, wherein said shaft having an axial bore to transfer fluid to an outer circumference of said shaft.

3. The press in claim 2, further comprising a seal to keep fluid between an outer circumference of said shaft and an inner circumference of said sleeve.

4. The press in claim 1, wherein said pressure means utilizes oil pressure for creating the interference fit between said sleeve and said shaft.

5. The press in claim 1, wherein said shaft is a crankshaft.

6. The press in claim 1, wherein said adjustment means is two or more gears.

7. The press in claim 6, wherein at least one of said two or more gears is a helical gear.

8. A press comprising:

a housing;

a shaft disposed within said housing;

a sleeve disposed within said housing;

a pressure means in fluid communication with said sleeve for supplying fluid pressure to said sleeve to create an interference fit between said sleeve and said shaft, said pressure means reduces fluid pressure to said sleeve to release the interference fit between said sleeve and said shaft wherein said sleeve works as a fluid bearing; and an adjustment means connected to said housing for moving said housing to adjust a rotational position of said shaft when the interference fit exists between said sleeve and said shaft.

9. The press in claim 8, wherein said shaft having an axial bore to transfer fluid to an outer circumference of said shaft.

10. The press in claim 8, further comprising a seal to keep fluid between an outer circumference of said shaft and an inner circumference of said sleeve.

11. The press in claim 8, wherein said pressure means utilizes oil pressure for creating the interference fit between said sleeve and said shaft.

12. The press in claim 8, wherein said shaft is a crankshaft.

13. The press in claim 8, wherein said adjustment means is two or more gears.

14. The press in claim 13, wherein at least one of said two or more gears is a helical gear.

15. A method of adjusting a position of a shaft in a press comprising:

providing a shaft and a sleeve;

applying fluid pressure to said sleeve to create an interference fit between said sleeve and said shaft; and adjusting a rotational position of said shaft when the interference fit exists between said sleeve and said shaft.

* * * * *